United States Patent [19]

McLean et al.

[11] Patent Number: 4,693,072
[45] Date of Patent: Sep. 15, 1987

[54] METHOD OF OPERATING A COMBINED CYCLE ELECTRIC POWER PLANT

[75] Inventors: George S. McLean, La Jolla, Calif.; Paul J. Grimes, Katy, Tex.; Albert van Gucht, Dendermonde, Belgium

[73] Assignee: Acec Power Systems Limited, Houston, Tex.

[21] Appl. No.: 899,732

[22] Filed: Aug. 25, 1986

[51] Int. Cl.$^4$ ............................................. F02C 3/22
[52] U.S. Cl. .............................. 60/39.02; 60/39.182; 60/39.465
[58] Field of Search ............... 60/39.02, 39.12, 39.181, 60/39.182, 39.183, 39.465, 736

[56] References Cited

U.S. PATENT DOCUMENTS

| | | | |
|---|---|---|---|
| 3,525,218 | 8/1970 | Buss | 60/39.465 |
| 3,704,587 | 12/1972 | Krieb et al. | 60/39.182 |
| 4,058,974 | 11/1977 | Pfenninger | 60/39.182 |
| 4,273,508 | 6/1981 | Fomichev et al. | 60/39.281 |
| 4,321,790 | 3/1982 | Vadas et al. | 60/39.182 |
| 4,418,530 | 12/1983 | Bodrov et al. | 60/39.181 |

*Primary Examiner*—Louis J. Casaregola
*Attorney, Agent, or Firm*—Vaden, Eickenroht, Thompson & Boulware

[57] ABSTRACT

A method of operating a combined cycle electric power plant at a measuring and regulating station of a gas transmission line is disclosed where gas at high pressure is being delivered from the transmission line to a lower pressure line, such as a gas distribution system, comprising the steps of supplying a portion of the gas to the combustion chamber of a gas turbine to drive a first electrical generator and produce electricity, using the hot gases in the exhaust of the gas turbine to heat water in a boiler and produce steam, supplying the steam to a steam turbine to drive a second electrical generator and produce electricity, reducing the pressure of the gas being delivered to the pressure of the lower pressure line, and using the heat of condensation of the exhaust steam from the steam turbine to keep the temperature of the gas at or above a selected minimum as the pressure of the gas is reduced from that of the high pressure line to the pressure of the lower pressure line. In one embodiment of the method, the pressure of the delivered gas is reduced by passing the gas through a turboexpander and using the output energy of the turboexpander to drive a third electrical generator and produce electricity.

7 Claims, 6 Drawing Figures

4,693,072

METHOD OF OPERATING A COMBINED CYCLE ELECTRIC POWER PLANT

This invention relates generally to gas and steam turbine combined cycle plants for generating electricity and, in particular, to such plants operating in combination with a measuring and regulating (M&R) station of a relatively high pressure gas transmission line.

Before gas is delivered to a customer from a high pressure natural gas pipeline, it flows through what is known as a measuring and regulating (M&R) station where the volume of gas being delivered is measured and the pressure reduced from the high pressure by passing the gas through a throttle valve. This causes a drop in the temperature of the gas as well as in the pressure since this type of expansion approaches a constant enthalpy process. A reduction in pressure of 3 to 1 can cause the temperature to drop 15°–20° F. and since the gas should be maintained at least above 32° F., and preferably around 40° F., there are many instances where heat must be added to the gas either before or after it is expanded. Usually this is done upstream to avoid the possibility of the temperature in the throttle valve dropping to the point where ice will form. The gas is heated usually by passing it through a hot water heat exchanger whereby the water is heated by gas fuel from the pipeline, usually the customer's. In the combined cycle system, gas is burned in a gas turbine that drives a generator that produces electricity. The hot exhaust gases from the gas turbine are used to produce steam that is used to drive a steam turbine and another generator to produce additional electricity. The thermal efficiency of these co-generation plants is about 40% on the average.

It is an object of this invention to provide a method of generating electricity using gas and steam turbines that has a substantially higher thermal efficiency than present plants and that under certain conditions can have a thermal efficiency as high as 70%.

It is a further object of this invention to provide a method of generating electricity using co-generation apparatus including a gas turbine and a steam turbine that recovers the heat given up by steam when it is condensed, i.e, the heat of condensation thereby greatly increasing the overall thermal efficiency of the plants.

It is a further object and feature of this invention to provide such a method of producing electricity that includes along with the steam and gas turbines, the step of reducing the pressure of the delivered gas with a turboexpander that recovers most of the energy that is normally lost when the gas is expanded through a throttle valve and converting that energy to electrical energy to raise substantially the overall thermal efficiency of the plant.

These and other objects, advantages, and features of this invention will be apparent to those skilled in the art from a consideration of this specification including the attached drawings and appended claims.

In the Drawings

Figure 1:
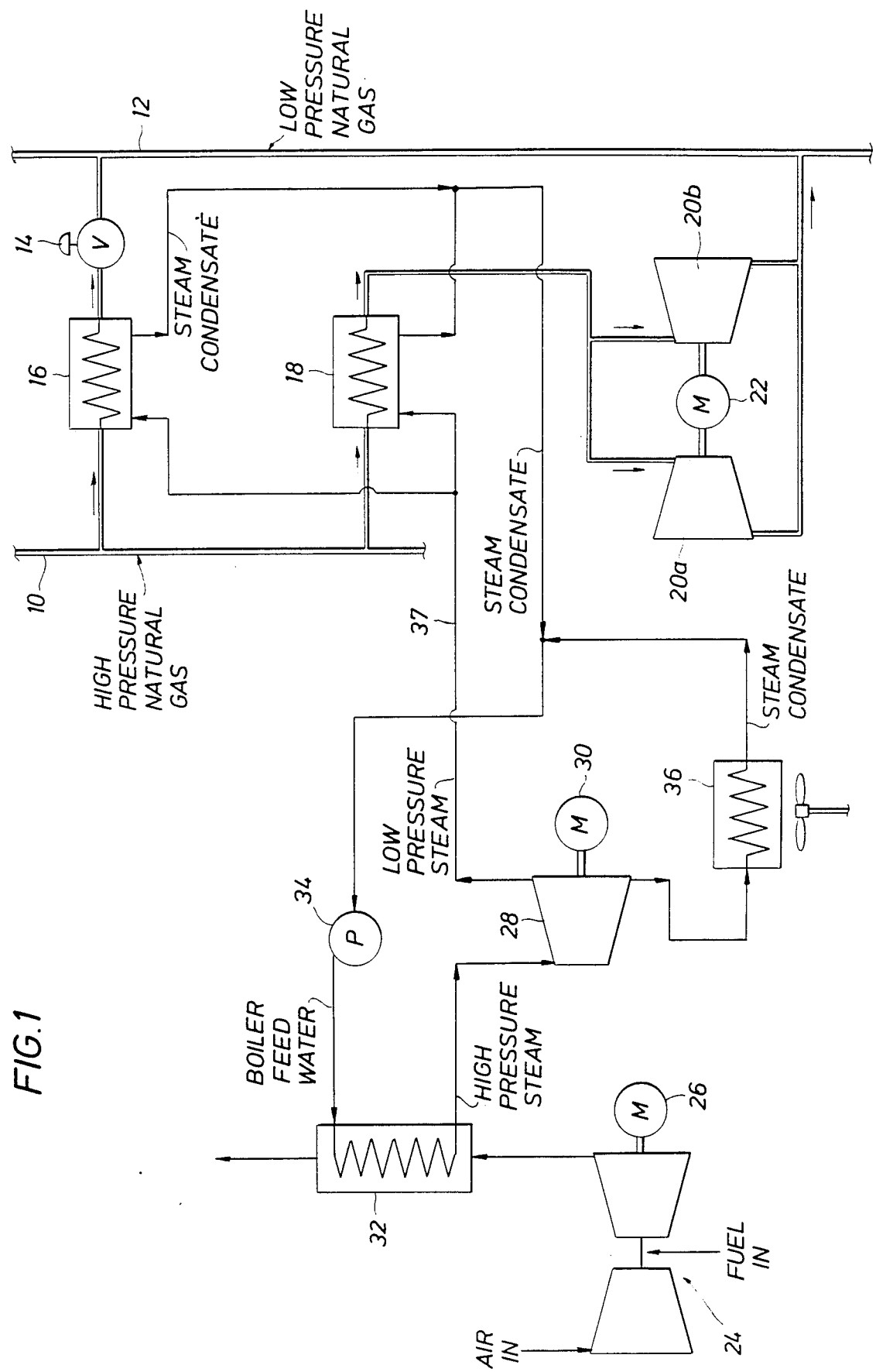
FIG. 1 is a schematic diagram of the preferred embodiment of the electric generating plant for practicing the method of this invention.

In the generating plant of FIG. 1, high pressure natural gas pipeline 10 is connected to low pressure natural gas pipeline 12 through two parallel pressure reducing means. The first one includes throttling valve 14 and heat exchanger 16 located upstream of the throttling valve. The other pressure reducing means includes heat exchanger 18 and turboexpanders 20a and 20b that drive generator 22. In the operation of the plant, it is contemplated that the pressure reduction process will be done by flowing the gas through the turboexpanders to obtain more electricity and the throttle valve will be used only when for some reason the turboexpanders cannot be used. The low pressure line may be the fuel line of a large power plant, an industrial plant or a local gas distribution system.

The remainder of the plant includes gas turbine 24 that drives generator 26 and steam turbine 28 that drives generator 30.

In operation, gas being delivered from the high pressure line to the lower pressure line is heated in heat exchanger 18 using a heat source to be described below and then expanded to a lower pressure through turboexpanders 20a and 20b. The turboexpanders drive electric generator 22 and produce electricity. Gas is also fed to gas turbine 24 where it is burned in the combustion chamber of the turbine. The turbine drives generator 26 and produces an additional amount of electricity.

The hot exhaust gases from the expansion turbine section of the gas turbine flow to boiler 32, which is supplied with water by boiler feed water pump 34. Heat from the exhaust gases is transferred to the water in the boiler producing high pressure steam that is used to drive steam turbine 28. Low pressure steam is exhausted from turbine 28 and travels back to the boiler along two routes. A portion of the steam is condensed in heat exchanger 36 and returns to the suction side of boiler feed water pump 34. Another portion of the low pressure stream moves through conduit 37 to heat exchanger 18, where the heat of condensation is removed from the steam causing it to condense. At the same time the heat of condensation raises the temperature of the gas flowing through the heat exchanger before the gas passes through the turboexpanders to ensure that the temperature of the gas is high enough above the freezing point at the outlet of turboexpanders 20a and 20b to avoid problems with hydrates, etc. The condensed steam is returned to the suction side of boiler feedwater pump 34. If the turboexpanders are not operating or if for some reason gas is flowing both through the turboexpanders and the throttle valve, low pressure steam is supplied to heat exchanger 16 to use the heat given up by the steam as it condenses to heat the gas upstream of the throttle valve.

Figure 2:
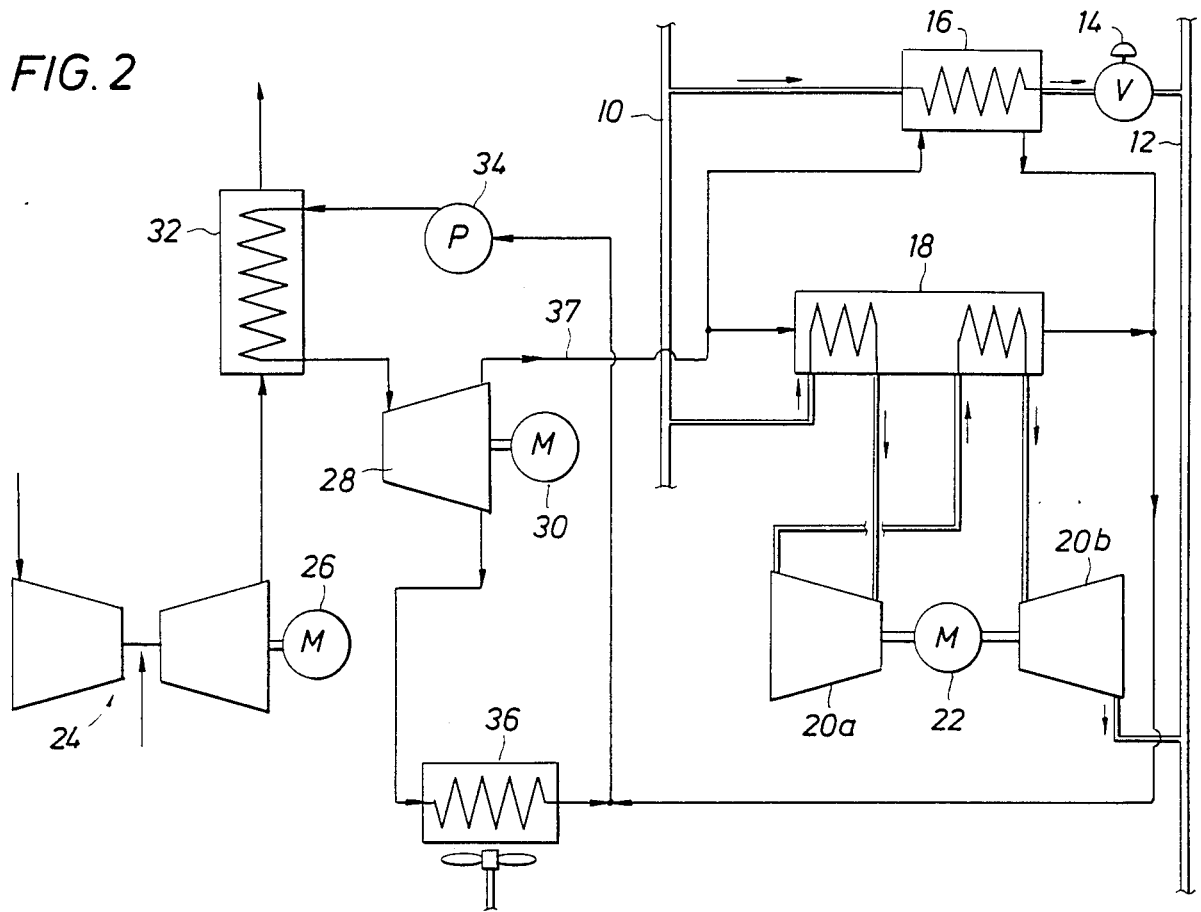
FIGS. 2–6 are alternate embodiments of generating plant for practicing the method of this invention.

In the embodiment shown in FIG. 2, instead of the gas flowing through two turboexpanders connected in parallel, all of the gas flows through turboexpanders 20a and 20b and the pressure drop is in stages, approximately one-half occurring in 20a and the other one-half occurring in 20b. In addition, in this embodiment, the gas is heated in heat exchanger 18 upstream of turboexpander 20a by the heat of condensation of the steam from steam turbine 28 and also between the stages before the gas flows through turboexpander 20b.

Figure 3:
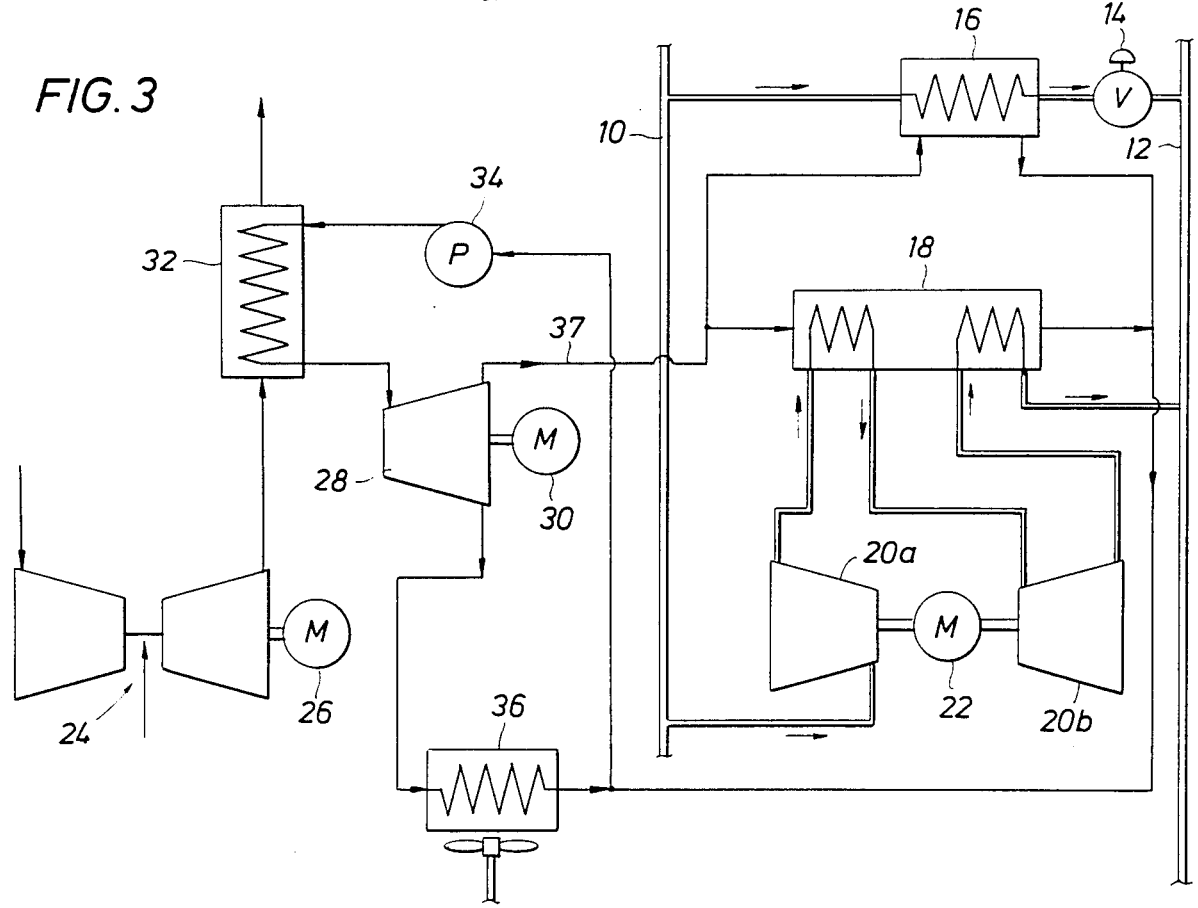

The plant shown in FIG. 3 is essentially the same as that described in FIG. 2 except here the gas is heated between the two stages of expansion and after it has passed through second turboexpander 20b prior to being delivered to the low pressure line.

Figure 4:
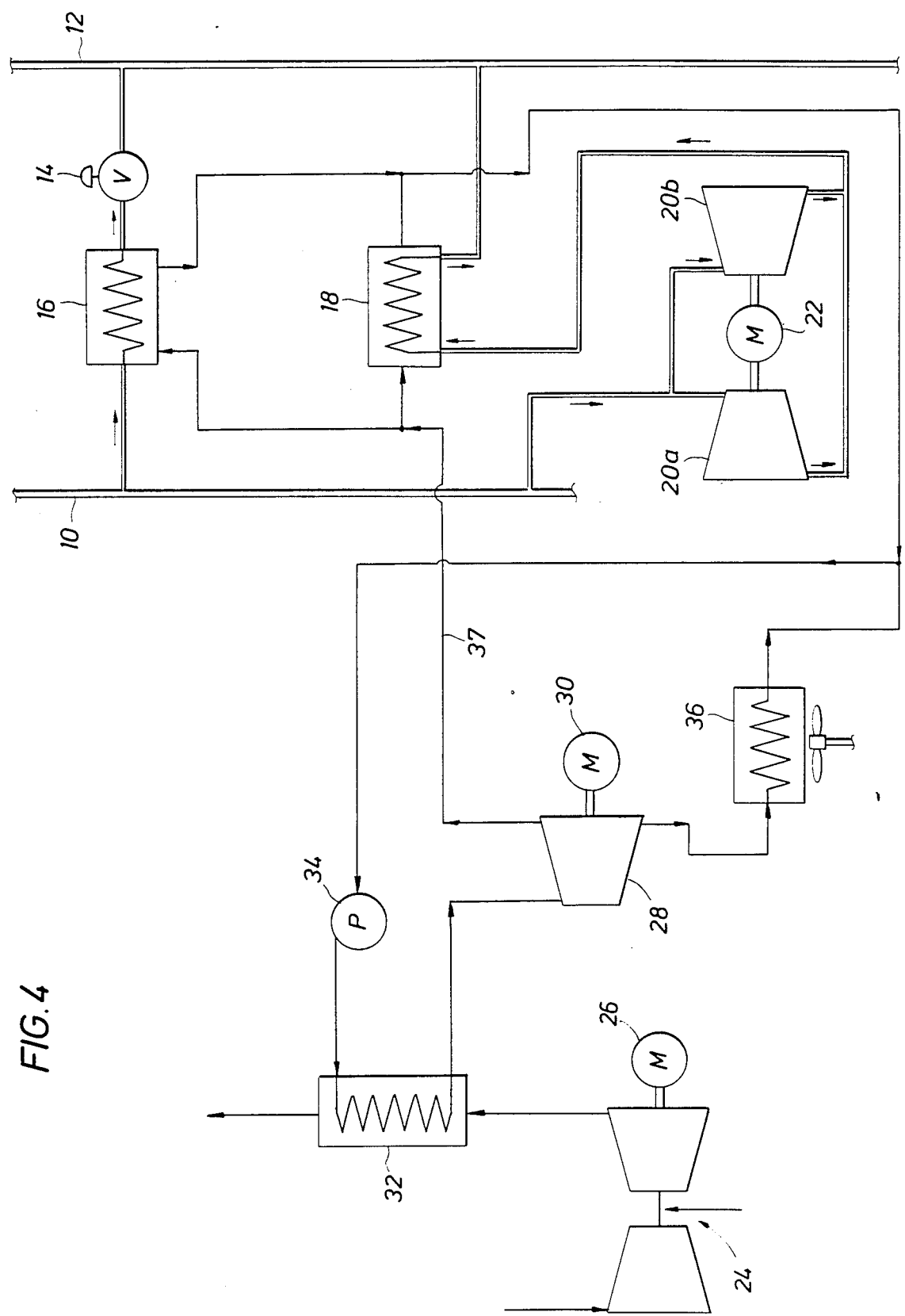

FIG. 4 is the same system as shown in FIG. 1 with the exception that the gas flowing from the high pressure line to the low pressure line is heated after it has passed through the turboexpanders.

Figure 5:
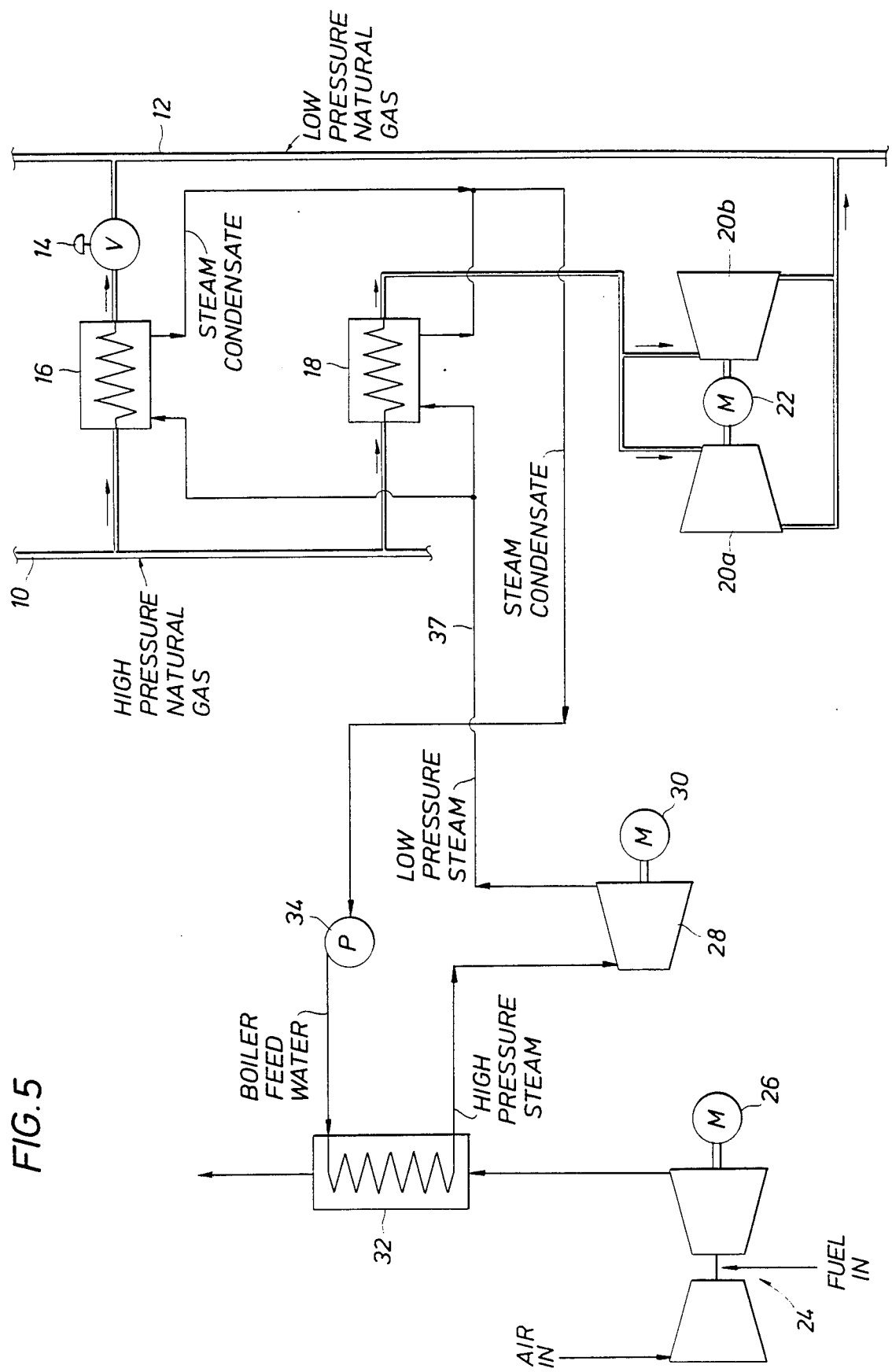

FIG. 5 is basically the same system as shown in FIG. 1 except all of the exhaust steam from steam turbine 28 is directed through heat exchanger 18 or heat exchanger 16 as the case may be, to provide as much heat as possible for transfer to the gas. Valves could be arranged to do this in the FIG. 1 plant, if desired, and would allow the steam provided to heat exchanger 18 to be adjusted as the temperature and volume of the gas being delivered varies.

Figure 6:
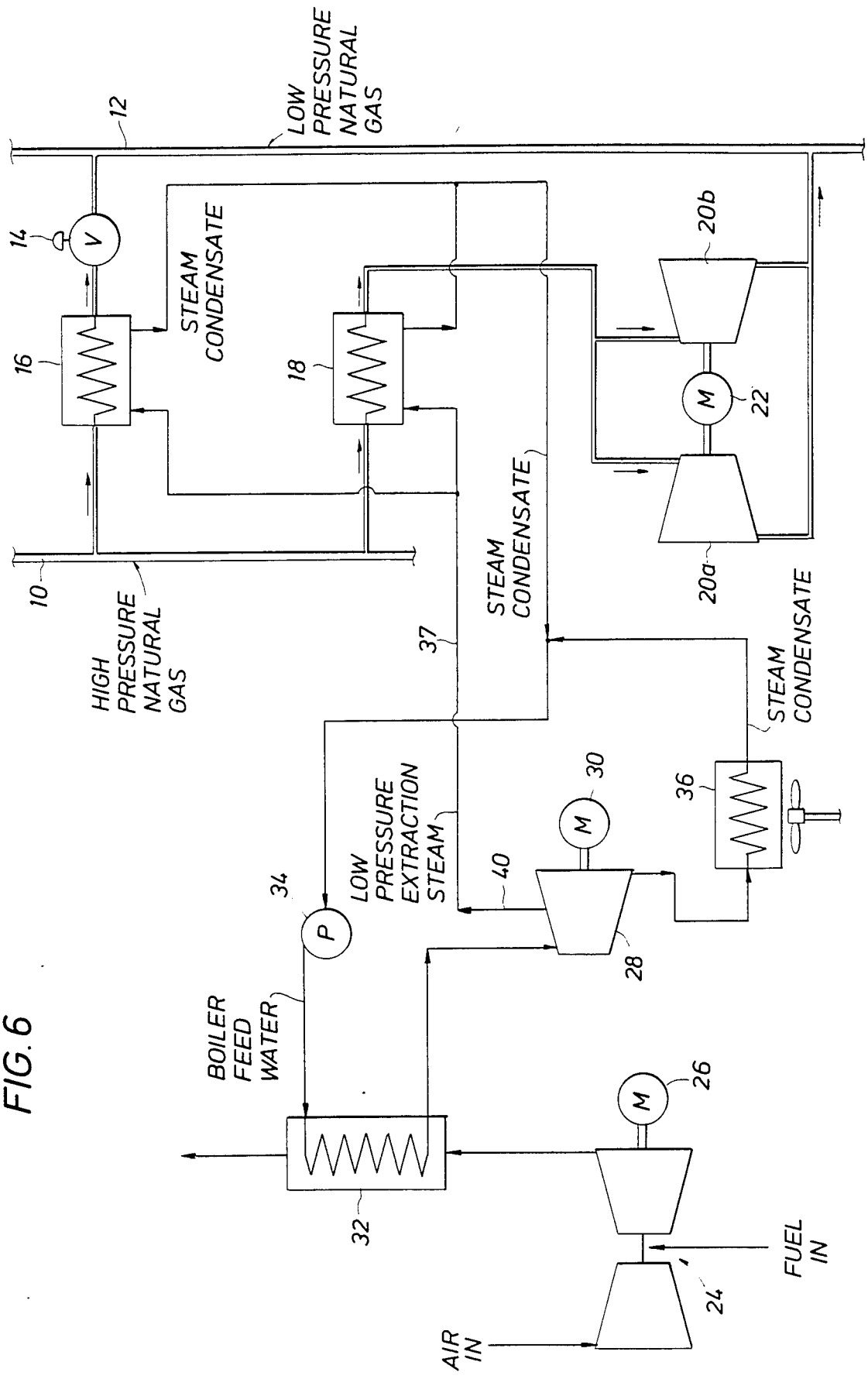

In the system shown in FIG. 6, a portion of the steam flowing through steam turbine 28 is extracted through conduit 40 before it has expanded completely through the turbine to provide heat at a higher pressure and temperature to heat exchanger 18. This may be required where the exhaust steam cannot supply the heat at a temperature high enough to avoid possible problems with hydrates and ice formation as explained above. This arrangement could also be incorporated in the other embodiments as alternatives.

Examples of the thermal efficiency that can be obtained by operating these plants using the method of this invention are set out below.

Assume that the gas turbine will produce approximately 8.3 MW of electrical power at ISO conditions with a fuel flow rate of $93 \times 10^6$ BTU/HR. Such a gas turbine by itself has a thermal efficiency of:

$$\eta\, th = \frac{(8.3 \times 10^3)(3411)}{93 \times 10^6} = 30.4\%.$$

It is common practice to increase this efficiency by utilizing the exhaust heat from the gas turbine to generate steam to drive a steam turbine. The exhaust from such a gas turbine as mentioned above will generally be around 870° F. with a mass flow rate of around 294,000 lbs/HR. Assuming normal losses and assuming that the exhaust leaves boiler 32 at 290° F., approximately $41.5 \times 10^6$ BTU/HR are available for steam generation. Thus, approximately 30,000 lbs./HR of steam at 350 psia and 850° F. can be generated. If the steam turbine driven by this steam has an isentropic efficiency of 0.84 and the steam will leave the turbine at 101° F. (2 in.hg) in a 6.5% wet state, the turbine will generate approximately 3221 KW:

Shaft power = 30,000 (1445 − 1037.6)
= 12.22 × 10⁶ BTU/HR

1445 = h of steam at 350 psia and 850° F.
1037.6 = h of 6.5% wet steam at 101° F. and 2 in. hg as expanded through a turbine with an isentropic efficiency of 84% assuming gear efficiency = 98%
generator efficiency = 97.5%
mechanical efficiency = 98%
losses from fans, pumps, etc. = 4%

Net power = 12.22 × 10⁶ BTU/HR × $\frac{1\ \text{KW-HR}}{3411\ \text{BTU}}$ ×

.98 × .975 × .98 × .96 = 3221 KW.

Thus, this standard combined cycle has a thermal efficiency of:

$$\eta\, th = \frac{(8300 + 3221) \times 3411}{93 \times 10^6} = 42.3\%$$

The present invention increases this thermal efficiency by combining this standard combined cycle system with a turboexpander that will recover most of the energy that is normally lost when the high pressure natural gas is expanded through a throttle valve to the much lower pressures that are required in gas distribution systems, or for use as fuel in boilers, gas turbines, or gas engines. This throttling valve process approaches a constant enthalpy process and a 3:1 pressure ratio drop will usually result in a temperature drop of 15–20° F. Expansion through a turboexpander approaches a constant entropy process and a 3:1 pressure ratio drop will usually result in a temperature drop of 110–130° F. In order to avoid outlet temperatures below a desired minimum which is usually 32–40° F., the gas must be heated before, after, or during the expansion in the turboexpander. The total amount of gas heating increases considerably during the winter months when the demand for gas used in homes and businesses as a heating fuel increases dramatically and the temperature of the gas coming out of the pipeline and into the M&R station decreases. The present invention utilizes the heat of condensation present in the steam when exiting from the steam turbine to heat the gas. All or most of this heat is usually rejected in a condenser as wasted thermal energy.

In some cases the steam turbine cycle mentioned above must be modified slightly as shown in FIG. 6, to provide steam for heating the gas entering the turboexpander at a temperature 20–30° F. above the required gas temperature after heating. As explained above, the required temperature of the gas is a function of the volume entering the M&R station, the entering temperature, the pressure reduction ratio, and the desired outlet temperature. Usually, no modifications to the steam turbine cycle are required when the gas is heated between stages of expansion and/or after expansion of the gas.

For the purposes of this illustration only a portion of the heat of condensation of the steam is used to heat the gas. Subsequently, the efficiency of a plant using all of the heat of condensation to heat the gas will be calculated below. For the purposes of this illustration, the gas is preheated from 60° F. to 150° F. Also, for the purpose of this illustration, the gas is preheated by steam extracted from the turbine at 7.5 psia and 180° F. The turboexpander used in this illustration is rated at 1.85 MW with a pressure reduction ratio of 3:1 and a heat rate of 4000 BTU/KW-HR to maintain the desired minimum temperature at the outlet of the turboexpander. Thus, the heat required to preheat the gas is $$Q_{in} = 1850 \times 4000 = 7.4 \times 10^6\ \text{BTU/HR}$$

Assuming 5% heat exchanger losses, the steam must provide 7.8 × 10⁶ BTU/HR:

$$Q_{out} = \frac{7.4 \times 10^6}{.95} = 7.8 \times 10^6\ \text{BTU/HR}$$

Thus, a mass flow rate of steam at 7.5 psia and 180° F. of 7870 lbs/HR is required calculated as follows:

$h_{cond.} = 1138.4 - 147.4 = 991$ BTU/lb.

$1138.4 = h$ of steam at an extraction point of 7.5 psia. The steam at that point is at 180° F. and dry and saturated after being expanded from 350 psia and 850° F. with an isentropic efficiency of 84%.

$147.4 = h$ of water at 7.5 psia and 180° F.

$$W = \frac{7.8 \times 10^6 \text{ BTU/HR}}{991 \text{ BTU/lb.}} = 7870 \text{ lbs/HR}$$

Thus the total work out of the steam turbine is decreased slightly to 3012 KW calculated as follows:

Shaft power = $(30,000 - 7870)(1445 - 1037.6) +$
$7870(1445 - 1138.4) = 11.43 \times 10^6$ BTU/HR assuming gear efficiency = 98%
generator efficiency = 97.5%
mechanical efficiency = 98%
losses from fans, pumps, etc. = 4%

Net power = $11.43 \times 10^6$ BTU/HR $\times \frac{1 \text{ KW-HR}}{3411 \text{ BTU}} \times$ $.98 \times .975 \times .98 \times .96 = \underline{3012 \text{ KW}}$ The additional 1.85 MW of power generated by the turboexpander more than compensates for this slight loss. The total thermal efficiency of the system with the turboexpander is:

$$\eta \, th = \frac{(1850 + 3012 + 8300) \times 3411}{93 \times 10^6} = 48.3\%$$

Thus, the addition of the turboexpander to the system significantly increases the efficiency of the system.

This high efficiency results from the energy extracted from the gas and converted into electric power that would otherwise be wasted. In addition, the usual requirement to burn gas as fuel to heat the gas prior to the traditional pressure throttling valve in the M&R station is eliminated by utilizing the heat of condensation from exhaust steam from the steam turbine that is usually rejected as waste. The incremental gas heating required to offset the larger temperature drop resulting from expansion in the turboexpander is also provided by the otherwise wasted heat of condensation. The useful energy extracted by the turboexpander is energy that was put into the gas when it was compressed in compressor stations along the pipeline system to offset pressure losses due to friction and maintain the high pressure necessary to optimize the efficiency of the pipeline. This energy, which otherwise is wasted, is recovered by the turboexpander generator in the form of electrical power. Thermal efficiencies of 70% or more for the total system including all three generating units can be attained when using all of the heat of condensation available from the steam exiting from the steam turbine for heating the gas being expanded in the turboexpander. An example of the efficiencies of such a plant follows:

Assume that the gas turbine will produce approximately 20.0 MW of electrical power at ISO conditions with a fuel flow rate of $211 \times 10^6$ BTU/HR. The thermal efficiency of such a turbine is:

$$\eta \, th = \frac{(20.0 \times 10^3)(3411)}{211 \times 10^6} = 32.3\%$$

The exhaust from such a gas turbine as mentioned above will generally be about 975° F. with a mass flow rate of around 591,000 lbs./HR.

Assuming normal losses and assuming that the exhaust leaves boiler 32 at 290° F., approximately 71,000 lbs./HR of steam at 350 psia and 925° F. can be generated. This assumes a condensing pressure of 2.0 psia.

$Q = C_p \times \Delta T \times W \times$ EFF.

$= .257 (975 - 290) 591,000 \times .95$ $= 98.8 \times 10^6$ BTU/HR

The enthalpy increase in the boiler is:

$1484 - 94 = 1390$ BTU/lb.

$$\text{Steam Flow} = \frac{98.8 \times 10^6 \text{ BTU/HR}}{1390 \text{ BTU/lb.}} = 71,000 \text{ lbs./HR}$$

If the steam turbine driven by this steam has an isentropic efficiency of 85% and the steam will leave the turbine at 126° F. (2.0 psia) in a 4.0% wet state, the turbine will generate approximately 7428 KW.

Shaft power = $71,000 (1484 - 1087)$
$= 28.19 \times 10^6$ BTU/HR $1484 = h$ of steam at 350 psia and 925° F.
$1087 = h$ of 4.0% wet steam at 126° F. and 2.0 psia as expanded through a turbine with an isentropic efficiency of 85%.

assuming gear efficiency = 98%
generator efficiency = 97.5%
mechanical efficiency = 98%
losses from fans, pumps, etc. = 4% net power = $28.19 \times 10^6$ BTU/HR $\times \frac{1 \text{ KW-HR}}{3411 \text{ BTU}} \times$ $.98 \times .975 \times .98 \times .96 = 7428$ KW Thus, this standard combined cycle has a thermal efficiency of:

$$\eta \, th = \frac{(20,000 + 7428) \times 3411}{211 \times 10^6} = 44.3\%$$

the present invention provides heat of condensation for preheating natural gas upstream of the tubroexpander in this illustration equal to $67.0 \times 10$ BTU/HR, assuming heat exchanger losses equal to 5%.

$Q = 71,000$ lbs./HR $\times (1087 - 94)$BTU/lb. $\times$ $.95 = 67.0 \times 10^6 \frac{\text{BTU}}{\text{HR}}$ Also for the purpose of this illustration, the turboexpander has a rating of 16.0 and a heat rate of 4000 BTU/KW-HR to maintain the desired minimum temperature at the outlet of the turboexpander.

Thus, the heat required to preheat the gas is:

$Q_{in} = 16,000$ $KW \times 4,000$ BTU/KW-HR $= 64 \times 10^6$ BTU/HR

This requirement is slightly less than the heat available. The thermal efficiency of such a plant is:

$$th = \frac{(20{,}000 + 7428 + 16{,}000) \times 3411}{211 \times 10^6} = 70.2\%$$

From the foregoing it will be seen that this invention is one well adapted to attain all of the ends and objects hereinabove set forth, together with other advantages which are obvious and which are inherent to the method.

What is claimed is:

1. A method of generating electricity where gas from a high pressure gas transmission line is being delivered to a lower pressure line, such as a gas distribution system, comprising the steps of supplying a portion of the gas to the combustion chamber of a gas turbine to drive a first electrical generator and produce electricity, using the hot gases in the exhaust of the gas turbine to heat water in a boiler and produce steam, supplying the steam to a steam turbine to drive a second electrical generator and produce electricity, reducing the pressure of the gas being delivered to the pressure of the low pressure line, and using the heat of condensation of the exhaust steam from the steam turbine to keep the temperature of the gas at or above a selected minimum as the pressure of the gas is reduced from that of the high pressure line to the pressure of the lower pressure line.

2. The method of claim 1 in which the pressure of the delivered gas is reduced by passing the gas through a turboexpander and the turboexpander drives a third electrical generator and produces electricity.

3. The method of claim 1 in which the pressure of the delivered gas is reduced by passing the gas through a throttling valve.

4. The method of claims 2 or 3 in which the gas is heated by the heat of condensation of the exhaust steam before its pressure is reduced.

5. The method of claims 2 or 3 in which the gas is heated after the pressure has been reduced.

6. The method of claim 2 in which the turboexpander has a plurality of stages and the gas is heated by the heat of condensation of the exhaust steam before each stage.

7. The method of claim 6 in which the gas is also heated by the heat of condensation of the exhaust steam after it passes through the last stage of the turboexpander.

* * * * *